United States Patent
Warren et al.

(10) Patent No.: US 12,073,318 B2
(45) Date of Patent: Aug. 27, 2024

(54) DEEP REINFORCEMENT LEARNING BASED METHOD FOR SURREPTITIOUSLY GENERATING SIGNALS TO FOOL A RECURRENT NEURAL NETWORK

(71) Applicant: HRL Laboratories, LLC, Malibu, CA (US)

(72) Inventors: Michael A. Warren, Northridge, CA (US); Christopher Serrano, Whittier, CA (US); Pape Sylla, Thousand Oaks, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 464 days.

(21) Appl. No.: 16/937,503

(22) Filed: Jul. 23, 2020

(65) Prior Publication Data

US 2021/0089891 A1    Mar. 25, 2021

Related U.S. Application Data

(60) Provisional application No. 62/905,106, filed on Sep. 24, 2019.

(51) Int. Cl.
  *G06N 20/00*  (2019.01)
  *G06N 3/08*  (2023.01)

(52) U.S. Cl.
  CPC ............. *G06N 3/08* (2013.01); *G06N 20/00* (2019.01)

(58) Field of Classification Search
  CPC ............. G06N 3/08; G06N 3/02; G06N 3/008
  See application file for complete search history.

(56) References Cited

U.S. PATENT DOCUMENTS

| | | | |
|---|---|---|---|
| 2019/0042761 A1* | 2/2019 | Wang | G06N 5/043 |
| 2021/0052206 A1* | 2/2021 | Kale | G06N 3/088 |
| 2021/0073618 A1* | 3/2021 | Boussarov | G06N 3/045 |

OTHER PUBLICATIONS

Chen et al., "Exploiting Vulnerabilities of Load Forecasting Through Adversarial Attacks", Jun. 15, 2019, e-Energy '19: Proceedings of the Tenth ACM International Conference on Future Energy Systems Jun. 2019, pp. 1-11. (Year: 2019).*
Gong et al., "Real-Time Adversarial Attacks", Jun. 22, 2019, arXiv:1905.13399v2, pp. 1-9. (Year: 2019).*
Inkawhich et al., "Snooping Attacks on Deep Reinforcement Learning", May 28, 2019, arXiv:1905.11832v1, pp. 1-12. (Year: 2019).*

(Continued)

*Primary Examiner* — David R Vincent
(74) *Attorney, Agent, or Firm* — TOPE-MCKAY & ASSOCIATES

(57) ABSTRACT

Described is an attack system for generating perturbations of input signals in a recurrent neural network (RNN) based target system using a deep reinforcement learning agent to generate the perturbations. The attack system trains a reinforcement learning agent to determine a magnitude of a perturbation with which to attack the RNN based target system. A perturbed input sensor signal having the determined magnitude is generated and presented to the RNN based target system such that the RNN based target system produces an altered output in response to the perturbed input sensor signal. The system identifies a failure mode of the RNN based target system using the altered output.

15 Claims, 7 Drawing Sheets

(56) References Cited

OTHER PUBLICATIONS

Russo et al., "Optimal Attacks on Reinforcement Learning Policies", Jul. 31, 2019, arXiv:1907.13548v1, pp. 1-20. (Year: 2019).*
Chen et al., "Evaluation of Reinforcement Learning-Based False Data Injection Attack to Automatic Voltage Control", Date of publication Jan. 8, 2018; date of current version Feb. 18, 2019. IEEE Transactions on Smart Grid, vol. 10, No. 2, pp. 2158-2169. (Year: 2019).*
Pattanaik et al., "Robust Deep Reinforcement Learning with Adversarial Attacks", Dec. 11, 2017, arXiv:1712.03632v1, pp. 1-15. (Year: 2017).*
Zhang et al., "Layerwise Perturbation-Based Adversarial Training for Hard Drive Health Degree Prediction", 2018, 2018 IEEE International Conference on Data Mining, pp. 1428-1433. (Year: 2018).*
Notification of Transmittal and The International Search Report, and the Written Opinion of the International Searching Authority for PCT/US2020/043340; date of mailing Nov. 6, 2020.
Minhao Cheng, et al: "Evaluating and Enhancing the Robustness of Dialogue Systems: A Case Study on a Negotiation Agent", Proceedings of the 2019 Conference of the North, vol. 3325, Jan. 1, 2019 (jan. 1, 2019 ), pp. 3325-3335, XP055742821, Stroudsburg, PA, USA.
Notification of the and the International Preliminary Report on Patentability Chapter II for PCT/US2020/043340; date of mailing Sep. 28, 2021.
Claims for Notification of the and the International Preliminary Report on Patentability Chapter II for PCT/US2020/043340; date of mailing Sep. 28, 2021.
Sun, M. et al., "Identify Susceptible Locations in Medical Records via Adversarial Attacks on Deep Predictive Models," In KDD 2018: The 24th ACM SIGKDD International Conference on Knowledge Discovery & Data Mining, Aug. 19-23, 2018. London. United Kingdom. ACM. pp. 793-801.
Goodfellow et al. in "Explaining and Harnessing Adversarial Examples" in The International Conference on Learning Representations (ICLR), 2015, pp. 1-11.
Papernot et al. in "Crafting Adversarial Input Sequences for Recurrent Neural Networks" in Military Communications Conference, 2016, pp. 1-6.
Schulman, J. W. (2017). "Proximal Policy Optimization." arXiv preprint arXiv:1707.06347, pp. 1-12.
Kingman and Ba in "Adam: A Method for Stochastic Optimization" in ICLR, 2015, pp. 1-15.
Response to communication pursuant to Rules 161 (1) and 162 EPC for the European Regional Phase Patent Application No. EP20754514. 6, dated Nov. 14, 2022.

* cited by examiner

| Attack Type | Attack Size | Timesteps Attacked | Peak Anomaly Score | Anomaly Duration (t) |
|---|---|---|---|---|
| None | 0 | 0 | 36,370 | 32 |
| Traditional Fixed Attack Size | .15 | 100 | 25,728 | 32 |
| Invention | 0 to 1.0 | 20 | 14,004 | 23 |

FIG. 5

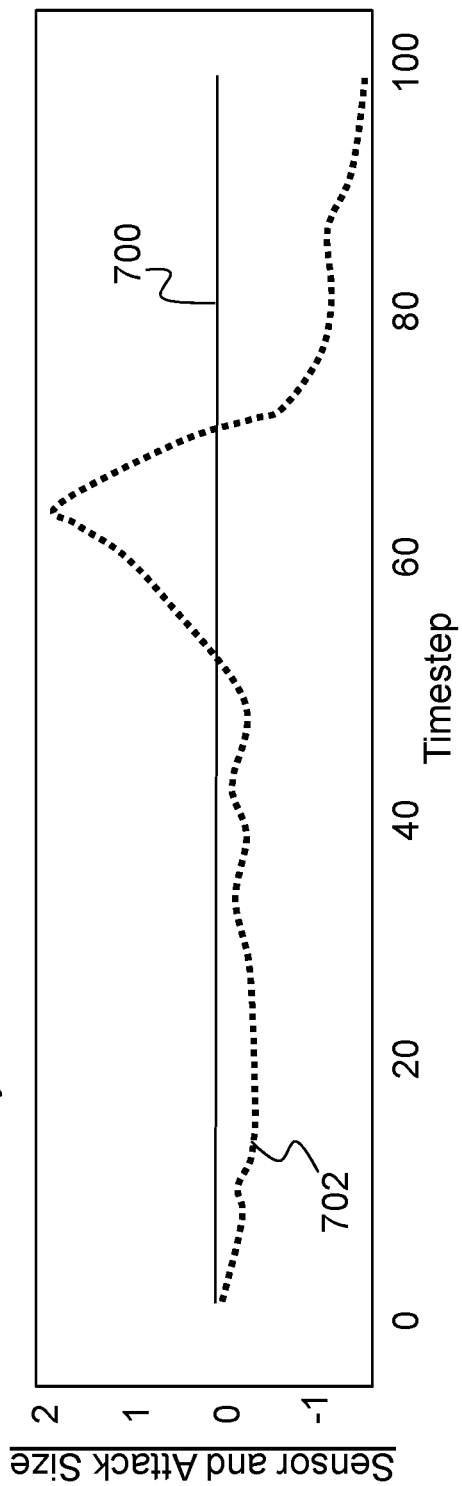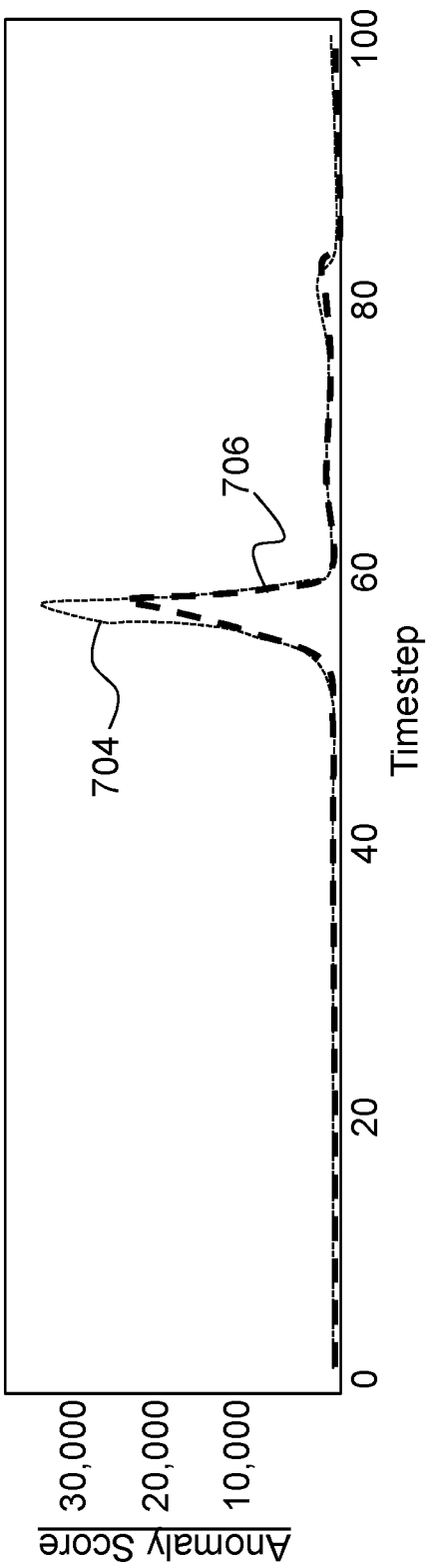
FIG. 7A
FIG. 7B

DEEP REINFORCEMENT LEARNING BASED METHOD FOR SURREPTITIOUSLY GENERATING SIGNALS TO FOOL A RECURRENT NEURAL NETWORK

CROSS-REFERENCE TO RELATED APPLICATIONS

The present application is a Non-Provisional Application of U.S. Provisional Application No. 62/905,106, filed in the United States on Sep. 24, 2019, entitled, "A Deep Reinforcement Learning Based Method for Surreptitiously Generating Signals to Fool a Recurrent Neural Network," the entirety of which is incorporated herein by reference.

BACKGROUND OF INVENTION

(1) Field of Invention

The present invention relates to an attack system for generating perturbations of input signals to a target system having a recurrent neural network as a component, and more particularly, to an attack system for generating perturbations of input signals to the target system using a deep reinforcement learning agent to generate the perturbations.

(2) Description of Related Art

Neural network based systems, such as those for classification of static images, are susceptible to so-called "adversarial perturbations". Adversarial perturbations are small perturbations of input images that are barely detectible by humans, but which radically alter the outputs of the neural network. Adversarial perturbations are specialized inputs created with the purpose of confusing a neural network, resulting in the misclassification of a given input. The existence of such perturbations can be potentially exploited by attackers and, more generally, reveal a failure of robustness of these models to small amounts of noise.

There has been elementary work on exploring perturbation based attacks in the setting of recurrent neural networks (RNNs), which are used to process sequence based input such as video, text, audio, or time-series data, which performs the original perturbation attack on each input at each time step. This invention suggests that these kinds of attacks are potentially a more significant challenge to RNN based systems than previously thought. The original perturbation based attack, which is known as the Fast Gradient Sign Method (FSGM), on (static) image classifiers is described by Goodfellow et al. in "Explaining and Harnessing Adversarial Examples" in The International Conference on Learning Representations (ICLR), 2015, which is hereby incorporated by reference as though fully set forth herein (hereinafter referred to as Goodfellow et al.). This work is not directly applicable to RNNs. However, an extension to RNNs was given in Papernot et al. in "Crafting Adversarial Input Sequences for Recurrent Neural Networks" in Military Communications Conference, 2016, which is hereby incorporated by reference as though fully set forth herein.

Prior work on RNN based time series attacks (i.e., ibid) relies on both a hand engineered attack size and attack length that requires expert tuning via experimentation. Furthermore, prior work on variable attack sizes applied iterative attacks that would not be conducive to attacking a time series RNN on-line, such as an RNN processing live sensor readings.

Thus, a continuing need exists for a system to learn both the timing and size of adversarial perturbations rather than requiring expert tuning and that can be used to attack an RNN on-line.

SUMMARY OF INVENTION

The present invention relates to an attack system for generating perturbations of input signals to a target system having a recurrent neural network as a component, and more particularly, to an attack system for generating perturbations of input signals to the target system using a deep reinforcement learning agent to generate the perturbations. The attack system comprises one or more processors and a non-transitory computer-readable medium having executable instructions encoded thereon such that when executed, the one or more processors perform multiple operations. The attack system trains a reinforcement learning agent to determine a magnitude of a perturbation with which to attack the RNN based target system. A perturbed input sensor signal having the determined magnitude is generated and presented to the RNN based target system such that the RNN based target system produces an altered output in response to the perturbed input sensor signal. The system identifies a failure mode of the RNN based target system using the altered output.

In another aspect, the reinforcement learning agent is trained to learn a timing for the perturbation.

In another aspect, an attack generator is used to generate the perturbed input sensor signal.

In another aspect, at each time step of training of the reinforcement learning agent, the system presents unattacked sensor data comprising a known property to attack to the reinforcement learning agent, wherein the reinforcement learning agent outputs a set of parameters of a probability distribution from which a set of attack parameters are sampled by the attack generator.

In another aspect, the system determines a scalar value using the unattacked sensor data, the set of attack parameters, the perturbed input signal, and altered output, wherein the scalar value represents relative success of the attack associated with the perturbed input sensor signal.

In another aspect, the system provides the scalar value to the reinforcement learning agent as a reward signal, thereby improving an attack strategy of the reinforcement learning agent.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 5 is a table illustrating experimental results comparing the invention to a traditional approach according to some embodiments of the present disclosure;

FIG. 7A is a graph illustrating results of anomaly detection on an ECG dataset with fixed attack size based on sensor and attack size; and FIG. 7B is a graph illustrating results of anomaly detection on an ECG dataset with fixed attack size based on anomaly score.

DETAILED DESCRIPTION

Figure 1:
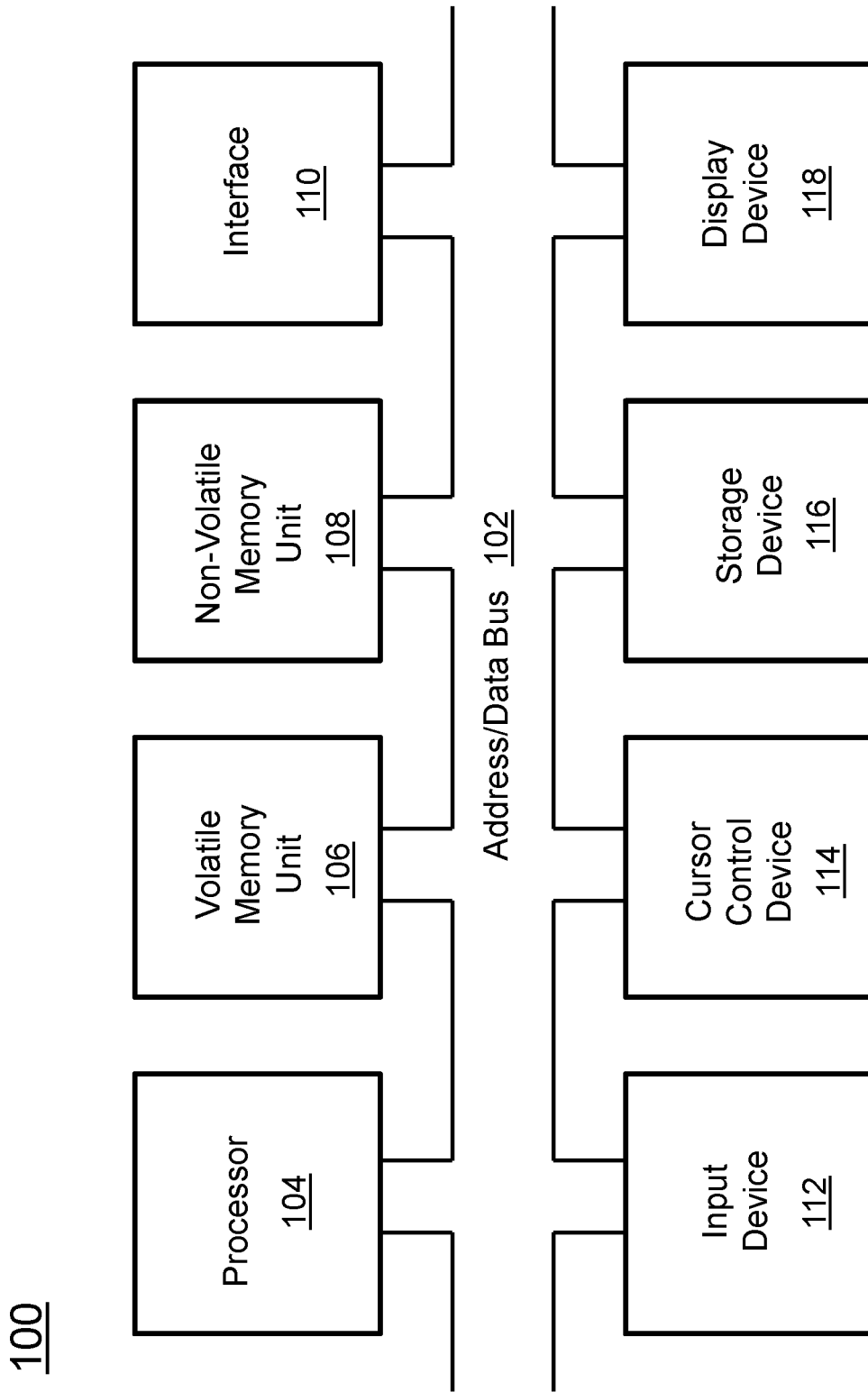
FIG. 1 is a block diagram depicting the components of an attack system according to some embodiments of the present disclosure.

The present invention relates to an attack system for generating perturbations of input signals to a target system having a recurrent neural network as a component, and more particularly, to an attack system for generating perturbations of input signals to the target system using a deep reinforcement learning agent to generate the perturbations. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Principal Aspects

Various embodiments of the invention include three "principal" aspects. The first is an attack system for generating perturbations of input signals of a target system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 104 In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104 In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
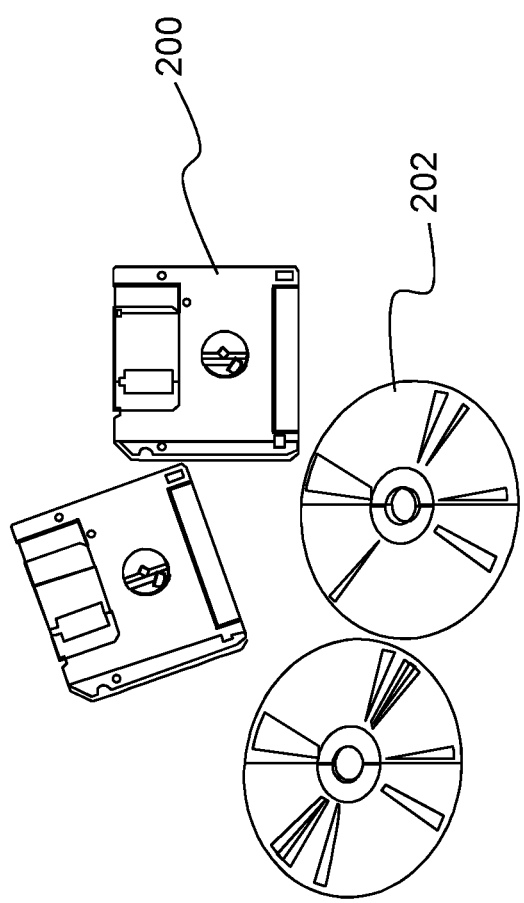
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Specific Details of Various Embodiments

It is well known that neural network based systems, such as those for classification of static images, are susceptible to so-called "adversarial perturbations". Adversarial perturbations are small perturbations of input images that are barely detectable by humans, but which radically alter the outputs of the neural network (e.g., pandas are now classified as gibbons). The existence of such perturbations can be potentially exploited by attackers and, more generally, reveal a failure of robustness of these models to small amounts of noise.

It is sometimes claimed that adversarial perturbations should not be a serious concern for neural network based systems that operate in real time, such as those used to process video data. The argument is that a missed classification due to this kind of perturbation does not matter if it is only on a single frame out of a large number of total frames. The invention described herein is a method that shows there are significant concerns for real time systems. In particular, given a real time neural network based system, which is implemented as a recurrent neural network (RNN), the system according to embodiments of the present disclosure uses a deep reinforcement learning (RL) agent to generate small changes to input signals so as to produce radically different outputs from the network. The use of reinforcement learning (RL) in the context of carrying out these kinds of attacks has not been previously explored.

The invention described herein significantly improves on the existing attacks of RNN based systems through use of a deep RL based scheduler that modifies both the timing and magnitude of attacked inputs in such a way to significantly affect the output of the attacked RNN. This process extends the amount of time during which the attack is effective, and reduces the amount of altered data required to carry out the attack, thereby making the attack more serious and more difficult for a defender to detect. In initial proof of concept experiments, a 33% improvement in the effectiveness of the attack was observed, a 28% increase in duration was observed, and a 80% reduction in the number of attacked time steps were observed.

(2.1) Operation of the Attack System

Figure 3:
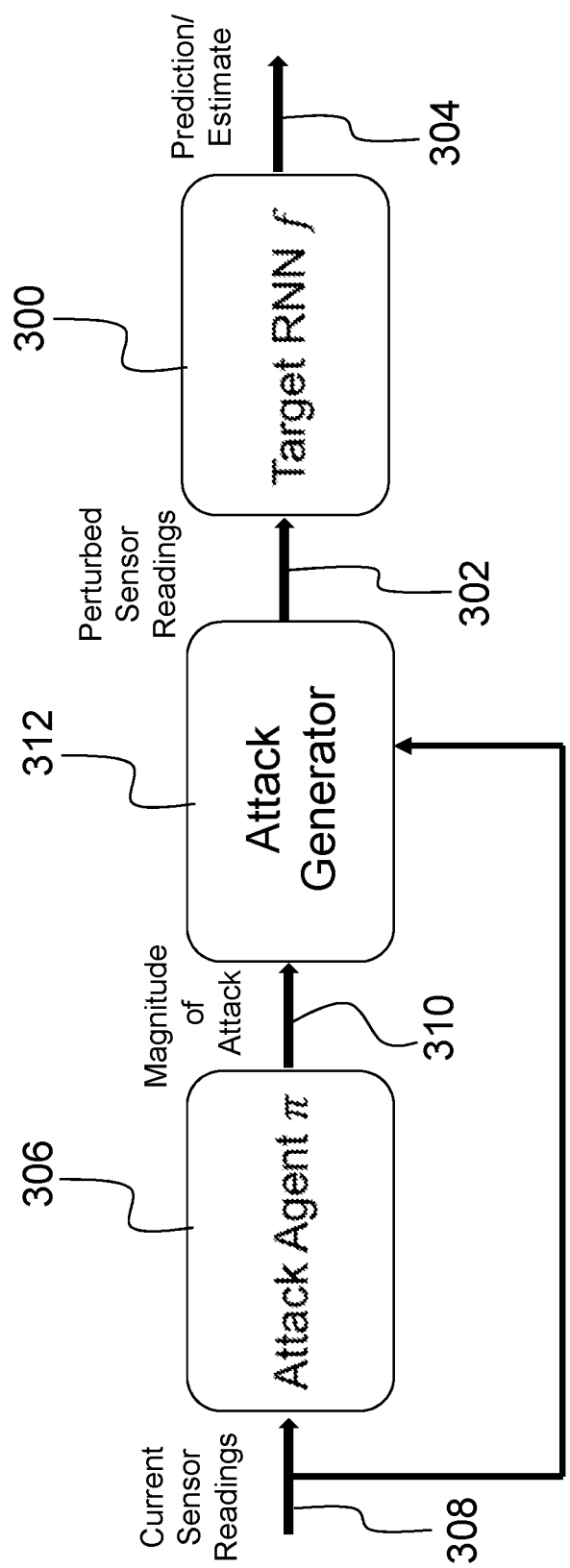
FIG. 3 is a flow diagram illustrating the attack system in operation according to some embodiments of the present disclosure.
Figure 4:
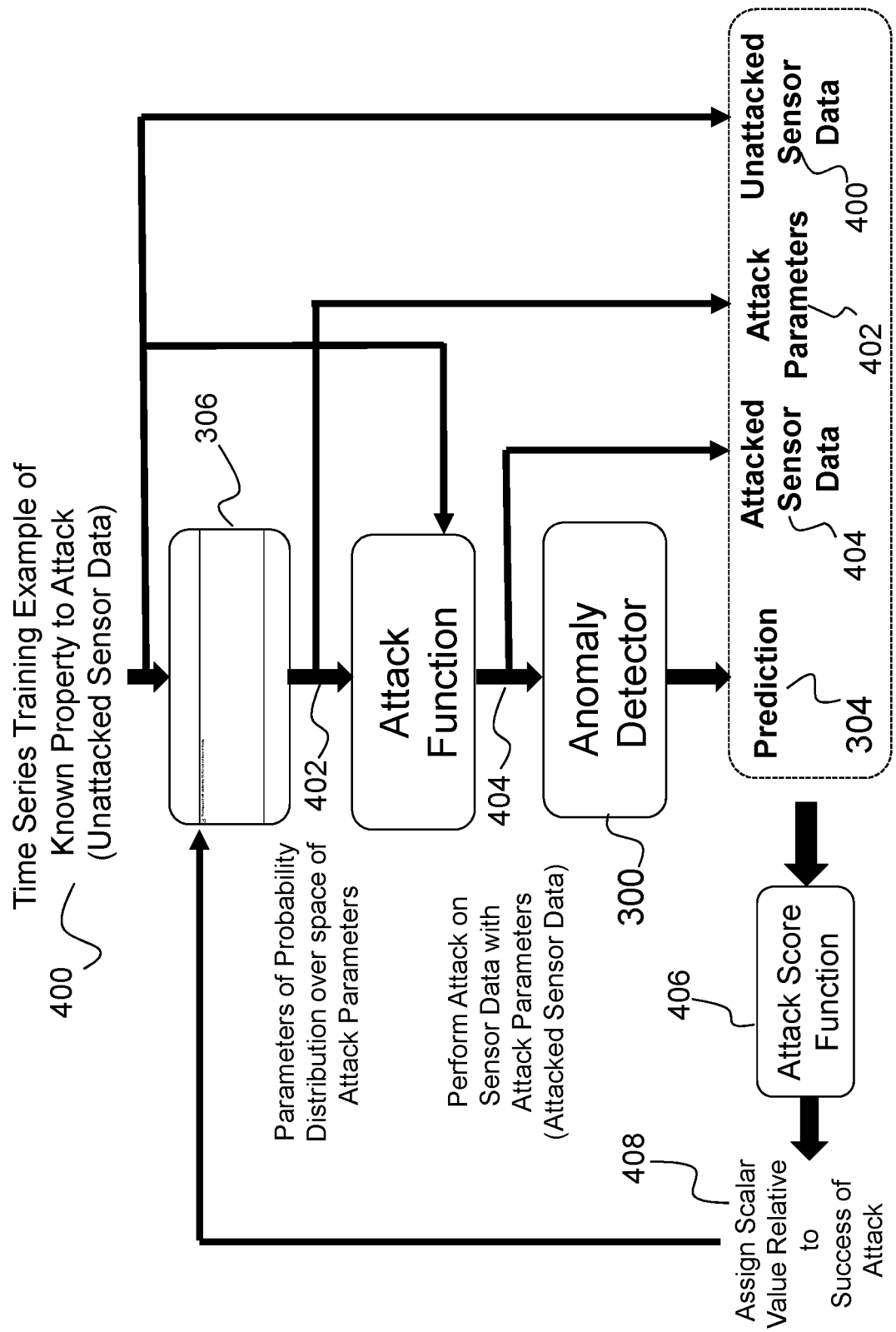
FIG. 4 is a flow diagram illustrating a procedure for training components of the attack system according to some embodiments of the present disclosure.

The invention comprises the Attack System depicted in FIG. 3 together with the procedure for training the components of the Attack System, shown in FIG. 4. The invention assumes the existence of a fixed (trained) Target RNN $f$ (element 300) that consumes input sensor readings (e.g., video frames, audio signals, system or human health monitoring signals, text), specifically perturbed sensor readings (element 302), and produces an output prediction or estimate (element 304), which can be used to identify a failure of the Target System that could be exploited by bad-actors (adversaries) or lead to unintended system behavior.

There are two variants of the invention described herein. In the first variant, the source code of $f$ is available to the attack agent $\pi$ (element 306) and attack generator (element 312), which is referred to as the white box case. In the second variant, the source code of $f$ is unavailable to the attack agent $\pi$ (element 306) and attack generator (element 312), which is referred to as the black box case. Typically, the black box case uses the white box case, but for another network $f'$ in order to establish a baseline agent. Extending the white box case to a black box attack is understood to one skilled in the art. A focus of the system described herein is what follows on the white box case, where the source code is available.

In addition to the Target RNN $f$ (element 300), the Attack System includes a neural network based reinforcement learning agent $\pi$ (i.e., the attack agent $\pi$ (element 306)), which determines the magnitudes of the perturbations with which to attack the Target RNN $f$ (element 300) at each instant, noting that an attack of magnitude 0 corresponds to no attack at all. The inputs to the attack agent $\pi$ (element 306) at a fixed time are the current sensor readings (element 308). The outputs of the attack agent $\pi$ (element 306) are the parameters (e.g., mean, covariance matrix) of a probability distribution over the space of the attack parameters (e.g., magnitude of perturbation (element 310) in each dimension). The details of the implementation of the attack agent $\pi$ (element 306) are allowed to vary, and a variety of reinforcement learning approaches can feasibly be used in the implementation of the attack agent $\pi$ (element 306). The outputs of the attack agent $\pi$ (element 306) are then fed to the Attack Generator (element 312). There are different approaches in the literature regarding how to implement the Attack Generator (element 312); experimental studies of the present invention were based on the Fast Gradient Signed Method (FGSM) of Goodfellow et al and can easily be recreated by one skilled in the art. The Attack Generator (element 312) attempts to generate a white box attack to ensure that the output estimate of the Target RNN (element 300) is incorrect. A white box attack is where the attacker has complete access to the model being attacked. The outputs of the Attack Generator (element 312), which are the perturbed sensor readings (element 302), are then fed to the original Target RNN $f$ (element 300), which produces a prediction or estimate (element 304). Non-limiting examples of predictions/estimates include presence of a pedestrian in the video frame for a video based object detection/classification system on an autonomous vehicle, presence of specific words in an audio sentence in a text-to-speech system, and the presence of an anomaly in an anomaly detection system.

(2.2) Training of the Attack System

Training of the Attack Agent $\pi$ (element 306) will occur in discrete timesteps and multiple training episodes, as shown in FIG. 4. At each timestep of an episode, training example (unattacked sensor data) containing a known property to attack will be presented to the Attack Agent $\pi$ (element 306) in temporal order. The Attack Agent $\pi$ (element 306) will output the parameters of a probability distribution (element 402) from which the parameters of the attack to perform at that timestep will be sampled and provided to the Attack Generator (element 312). The Attack Generator will then perform an attack on the training example (sensor data) with the parameters prescribed by the Attack Agent $\pi$ (element 306) (i.e., attacked sensor data (element 404)) and present the attacked sensor data to the Target RNN $f$ (element 300) for prediction (element 304). Any combination of the Target RNN $f$ prediction (element 304), the attacked (element 404), unattacked sensor data (element 400), and attack parameters (element 402) may then be provided to an Attack Score function (element 406) to determine the relative success (i.e., scalar value (element 408)) of the attack which will be provided back to the Attack Agent $\pi$ (element 306) as a reward signal to improve its attack strategy. The Attack Generator and Attack Score function (element 406) are use case specific and may be defined in any way that capture the desired properties of the attack and assigns it a scalar value (element 408) relative to the success of the attack, respectively. The Attack Agent $\pi$ (element 306) may be presented with many training examples or only a single training example in a given training episode, and training may continue for an undetermined number of episodes until the attack is deemed a success (e.g., when attacked inputs are deemed by the user to be sufficiently imperceptible while correctly altering the estimates of the Target RNN).

(2.3) Experimental Studies

In experimental studies, the target system is an anomaly detector system that provides an anomaly score at each timestep. The anomaly score is computed with an online multi-step RNN prediction error, and the mean ($\mu$) and covariance (Cov) of predictions made during a prior RNN training phase formally defined as follows:

$$\text{Anomaly Score} = (\text{error} - \mu) Co^{-1} (\text{error} - \mu)^T.$$

Higher anomaly scores (e.g., greater than 20,000 in FIG. 7B) signify a larger anomaly. These details will be familiar to anyone skilled in the art.

Referring to FIG. 3, in the embodiment used in experimental studies, the Target RNN (element 300) is the anomaly detector system and the current sensor readings (element 308) are time series sensor readings. In the case of anomaly detection for health monitoring purposes, the current sensor readings (element 308) could be an electrocardiogram signal, for example. The goal of this embodiment is to alter the time series sensor readings by adding small perturbations, resulting in perturbed sensor readings (element 302), so as to prevent anomalies from being correctly detected. In the example of health monitoring from electrocardiogram data, the invention described herein allows its user to identify a defect in their health monitoring RNN that could, if deployed, potentially lead to existing health conditions of patients going undetected. In experimental studies, a deep reinforcement learning (RL) agent (Attack Agent $\pi$ (element 306)) was trained via the Proximal Policy Optimization algorithm (described by Schulman in Proximal Policy Optimization, 2017, which is hereby incorporated by reference as though fully set forth herein). At each timestep, the Attack Agent $\pi$ (element 306) consumes the current sensor readings (element 308) as the state and outputs the size of attack to be performed (i.e., magnitude of attack (element 310)). This formulation includes the ability to select an attack of size 0 and therefore, over a time window, the Attack Agent $\pi$ (element 306) may learn a policy that controls both the timing and size of each attack.

In this embodiment, the Attack Agent $\pi$ (element 306) consists of two fully connected dense neural networks, the actor and critic, each with two hidden layers of 16 nodes each with rectified linear unit (ReLU) activation. The critic has a single linear output node trained to estimate the advantage of a given state, while the actor has two output nodes, mean and standard deviation, with hyperbolic tangent and softplus activation, respectively, that parameterize a normal distribution from which the action (e.g., attack size) is sampled. The policy was constrained to the interval [−1,1], which was then clipped to the interval [0,1] before being passed to the Attack Generator (element 312). Both actor and critic were optimized via the Adam optimizer with a learning rate of 1e-3 and a batch size of 64. The Adam optimizer is described by Kingman and Ba in "Adam: A Method for Stochastic Optimization" in ICLR, 2015, which is hereby incorporated by reference as though fully set forth herein. The Attack Agent π (element 306) maximizes the sum of future discounted reward and receives the negative log of the anomaly score as reward so that it will effectively learn an attack policy that minimizes the sum anomaly score of a given set of time series sensor readings (element 308). This is only one potential formulation of the reward signal; other formulations could emphasize fewer attacks, smaller attacks, or any other combination of characteristics the attacker desires.

During training (see FIG. 4), the Attack Agent π (element 306) selects a policy (e.g., attack parameters (element 402), such as attack size) for each timestep of the training example and an FGSM attack (see Goodfellow et al.) of the selected size (element 404) is performed on the data before it is provided to the target RNN (element 300) for prediction (element 304) until the conclusion of the training example. Upon the conclusion of training, the anomaly detector (i.e., the target system (element 300) is then queried for the anomaly scores (i.e., prediction/estimate (element 304) at each timestep, and the negative log of these scores is provided to the Attack Agent π (element 306) as reward from which a random batch of 64 timesteps are sampled to calculate a policy improvement update as is familiar to one skilled in the art. The policy rollout, anomaly score calculation, and update step constitutes a single episode, where the policy rollout and update are as in standard reinforcement learning and will be familiar to anyone skilled in the art. The Attack Agent π (element 306) was trained for 150 such episodes to achieve the results shown in FIGS. 5, 6A-6B, and 7A-7B. The initial experimentation was performed with one training example to construct a single adversarial example; however, this approach can be trivially extended to incorporate many training examples to either construct multiple independent adversarial examples or to train on many examples and learn a more general attack policy that generalizes broadly to yet unseen examples.

The invention described herein learns a much sparser attack pattern than traditional FGSM approaches and more successfully and efficiently fools an anomaly detection system monitoring the attacked RNN. FIG. 5 is a table illustrating experimental results comparing the invention (element 500) to a traditional fixed attack size (element 502) and no attack (element 504). The results are also depicted in FIGS. 6B and 7B, described below. Referring to FIG. 5, the invention achieves a 61% reduction in the peak anomaly score (element 506) compared to no attack, while the traditional fixed attack size only approaches a 29% reduction compared to no attack. In addition, the method described herein further reduces the duration of the detected anomaly (element 508) by 28% compared to no attack, while the traditional fixed attack size approach makes no improvement in this regard. The invention accomplishes these improvements with 80% fewer attacked time steps (element 510) than the traditional fixed attack size approach further reducing the potential discoverability of the attack.

Figure 6A:
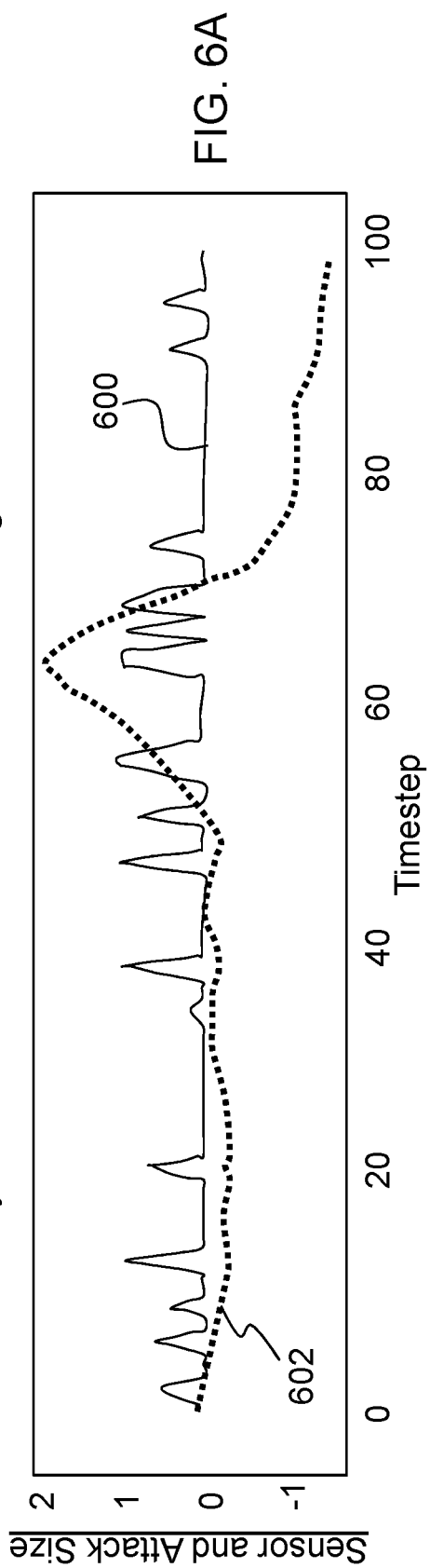
FIG. 6A is a graph illustrating results of anomaly detection on an electrocardiogram (ECG) dataset with a reinforcement learning (RL) agent attack based on sensor and attack size according to some embodiments of the present disclosure.
Figure 6B:
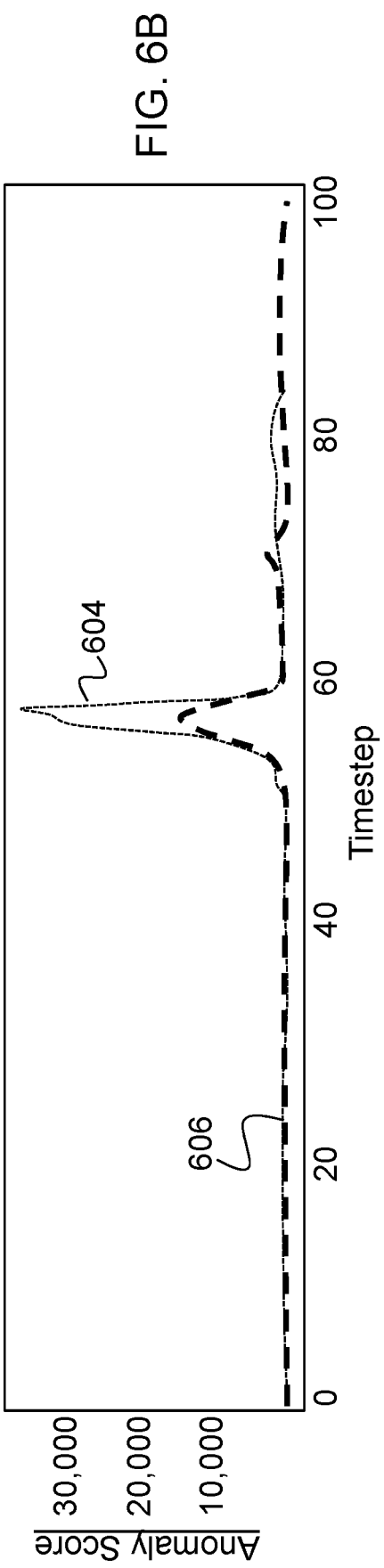
FIG. 6B is a graph illustrating results of anomaly detection on an ECG dataset with a RL agent attack based on anomaly score according to some embodiments of the present disclosure.

FIGS. 6A and 6B illustrate anomaly detection on an electrocardiogram (ECG) dataset with a RL agent attack according to embodiments of the present disclosure. In FIG. 6A, the solid line (element 600) represents attack size, and the dotted line (element 602) represents electrocardiogram sensor readings monitoring electrical activity of the heart. FIG. 6A shows the relation in time between the timing and magnitude of attack signals (solid line, element 600) produced by the Attack Agent and the original input signal (dotted line, element 602). In FIG. 6B, the unbolded dashed line (element 604) represents anomaly scores for unattacked sensor data, and the bold dashed line (element 606) represents anomaly scores for attacked sensor data. FIG. 6B shows that in the presence of the perturbed signals generated by the Attack Agent, the anomaly score is significantly decreased, meaning that should such perturbations be present in the signal, the anomaly detection system would fail to correctly identify potential cardiovascular issues in the individual from whom the data was gathered.

FIGS. 7A and 7B illustrate anomaly detection on the ECG dataset with state-of-the art fixed attack size. In FIG. 7A, the solid line (element 700) represents attack size, and the dotted line (element 702) represents sensor readings. In FIG. 7B, the unbolded dashed line (element 704) represents anomaly scores for unattacked sensor data, and the bold dashed line (element 706) represents anomaly scores for attacked sensor data. Comparing FIG. 6B (the invention) to FIG. 7B (the traditional approach), it is clear that the invention achieves a 61% reduction in the peak anomaly score (element 606) compared to no attack (element 604), while the traditional fixed attack size only approaches a 29% reduction (element 706) compared to no attack (element 704).

While there have been iterative approaches to attacking RNNs, the idea to train a RL agent to generate and schedule the attacks is unique, as exhibited by the fact that despite all of the recent work in machine learning and the well-known nature of the basic attack on static image classifiers, no one has previously attempted this approach. Furthermore, the invention is unique in using the deep RL agent to learn both the timing and size of the adversarial perturbations. Prior work on RNN based time series attacks relies on both a hand engineered attack size and attack length that requires expert tuning via experimentation. The invention also offers the potential of generalizability where a learned attack on one example may be immediately generalizable to yet unseen examples by the RL agent. Prior work on variable attack sizes applied iterative attacks that would not be conducive to attacking a time series RNN on-line, such as an RNN processing live sensor readings, while the invention is able to select a larger single attack size in cases that would have previously required iteration.

The invention is a subcomponent of a system which produces output signals and consumes input signals, the production of which involves the use of a recurrent neural network as a software component. Non-limiting examples of applications of the invention include a system for carrying out system health monitoring on an automotive or aerospace platform based on sensor readings; a computer vision system for classifying potential obstacles based on video data of the kind used on autonomous vehicle platforms; a system for doing analysis of text or speech (audio) data in order to carry out machine translation, sentiment detection, or related tasks; and a system for performing anomaly detection functions based on a signal over time (e.g., detection of arrhythmia from electrocardiogram data).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

The invention claimed is:

1. An attack system for generating perturbations of input signals to a Target recurrent neural network (RNN) based anomaly detector system configured to receive input sensor signals and produce outputs, the attack system comprising:
one or more processors and a non-transitory computer-readable medium having executable instructions encoded thereon such that when executed, the one or more processors perform operations of:
training a reinforcement learning agent to determine a magnitude of a perturbation with which to attack the Target RNN based anomaly detector system, wherein training the reinforcement learning agent comprises presenting, at each time step, unattacked sensor data comprising a known property to attack to the reinforcement learning agent in temporal order,
wherein the reinforcement learning agent receives time series sensor readings and outputs a set of attack parameters sampled from a probability distribution over a set of perturbation magnitudes;
altering, in real-time, the time series sensor readings with at least one perturbation at the determined magnitude to generate a perturbed input signal, the perturbed input signal being altered so as to prevent the Target RNN based anomaly detector system from correctly predicting a presence of an anomaly;
presenting, in real-time, the perturbed input sensor signal to the Target RNN based anomaly detector system such that the Target RNN based anomaly detector system produces a prediction of a presence of an anomaly in the Target RNN based anomaly detector system; and
using the prediction, identifying a failure of the Target RNN based anomaly detector system based on a failure to correctly predict the presence of the anomaly.

2. The attack system as set forth in claim 1, wherein the one or more processors further perform an operation of training the reinforcement learning agent to learn a timing for the at least one perturbation.

3. The attack system as set forth in claim 1, wherein the one or more processors further perform an operation of using an attack generator to generate the perturbed input sensor signal.

4. The attack system as set forth in claim 1, wherein the one or more processors further perform an operation of determining a scalar value using the unattacked sensor data, the set of attack parameters, the perturbed input signal, and the prediction, wherein the scalar value represents success of the attack associated with the perturbed input sensor signal.

5. The attack system as set forth in claim 4, wherein the one or more processors further perform an operation of providing the scalar value to the reinforcement learning agent as a reward signal, thereby improving an attack strategy of the reinforcement learning agent.

6. A computer implemented method for generating perturbations of input signals to a Target recurrent neural network (RNN) based anomaly detector system configured to receive input sensor signals and produce outputs, the computer implemented method comprising an act of:
causing one or more processors to execute instructions encoded on a non-transitory computer-readable medium, such that upon execution, the one or more processors perform operations of:
training a reinforcement learning agent to determine a magnitude of a perturbation with which to attack the Target RNN based anomaly detector system, wherein training the reinforcement learning agent comprises presenting, at each time step, unattacked sensor data comprising a known property to attack to the reinforcement learning agent in temporal order,
wherein the reinforcement learning agent receives time series sensor readings and outputs a set of attack parameters sampled from a probability distribution over a set of perturbation magnitudes;
altering, in real-time, the time series sensor readings with at least one perturbation at the determined magnitude to generate a perturbed input signal, the perturbed input signal being altered so as to prevent the Target RNN based anomaly detector system from correctly predicting a presence of an anomaly;
presenting, in real-time, the perturbed input sensor signal to the Target RNN based anomaly detector system such that the Target RNN based anomaly detector system produces a prediction of a presence of an anomaly in the Target RNN based anomaly detector system; and
using the prediction, identifying a failure of the Target RNN based anomaly detector system based on a failure to correctly predict the presence of the anomaly.

7. The computer implemented method as set forth in claim 6, wherein the one or more processors further perform an operation of training the reinforcement learning agent to learn a timing for the at least one perturbation.

8. The computer implemented method as set forth in claim 6, wherein the one or more processors further perform an operation of using an attack generator to generate the perturbed input sensor signal.

9. The computer implemented method as set forth in claim 6, wherein the one or more processors further perform an operation of determining a scalar value using the unattacked sensor data, the set of attack parameters, the perturbed input signal, and the prediction, wherein the scalar value represents success of the attack associated with the perturbed input sensor signal.

10. The computer implemented method as set forth in claim 9, wherein the one or more processors further perform an operation of providing the scalar value to the reinforcement learning agent as a reward signal, thereby improving an attack strategy of the reinforcement learning agent.

11. A computer program product for generating perturbations of input signals to a Target recurrent neural network (RNN) based anomaly detector system configured to receive input sensor signals and produce outputs, the computer program product comprising:
computer-readable instructions stored on a non-transitory computer-readable medium that are executable by a computer having one or more processors for causing the one or more processors to perform operations of:

training a reinforcement learning agent to determine a magnitude of a perturbation with which to attack the Target RNN based anomaly detector system, wherein training the reinforcement learning agent comprises presenting, at each time step, unattacked sensor data comprising a known property to attack to the reinforcement learning agent in temporal order, wherein the reinforcement learning agent receives time series sensor readings and outputs a set of attack parameters sampled from a probability distribution over a set of perturbation magnitudes;

altering, in real-time, the time series sensor readings with at least one perturbation at the determined magnitude to generate a perturbed input signal, the perturbed input signal being altered so as to prevent the Target RNN based anomaly detector system from correctly predicting a presence of an anomaly;

presenting, in real-time, the perturbed input sensor signal to the Target RNN based anomaly detector system such that the Target RNN based anomaly detector system produces a prediction of a presence of an anomaly in the Target RNN based anomaly detector system; and using the prediction, identifying a failure of the Target RNN based anomaly detector system based on a failure to correctly predict the presence of the anomaly.

12. The computer program product as set forth in claim 11, further comprising instructions for causing the one or more processors to further perform an operation of training the reinforcement learning agent to learn a timing for the at least one perturbation.

13. The computer program product as set forth in claim 11, further comprising instructions for causing the one or more processors to perform an operation of using an attack generator to generate the perturbed input sensor signal.

14. The computer program product as set forth in claim 11, further comprising instructions for causing the one or more processors to further perform an operation of determining a scalar value using the unattacked sensor data, the set of attack parameters, the perturbed input signal, and the prediction, wherein the scalar value represents success of the attack associated with the perturbed input sensor signal.

15. The computer program product as set forth in claim 14, further comprising instructions for causing the one or more processors to further perform an operation of providing the scalar value to the reinforcement learning agent as a reward signal, thereby improving an attack strategy of the reinforcement learning agent.

* * * * *